United States Patent [19]

Hart

[11] Patent Number: 5,794,562
[45] Date of Patent: Aug. 18, 1998

[54] POULTRY BREEDER PAN FEEDING SYSTEM AND PAN FEEDER ASSEMBLY THEREFOR

[75] Inventor: John F. Hart, Holland, Mich.

[73] Assignee: Big Dutchman, Inc., Holland, Mich.

[21] Appl. No.: 786,661

[22] Filed: Jan. 21, 1997

[51] Int. Cl.⁶ .................................................. A01K 39/01
[52] U.S. Cl. ........................ 119/52.4; 119/57.4; 119/53
[58] Field of Search ............................ 119/52.4, 53, 57.4

[56] References Cited

U.S. PATENT DOCUMENTS

| 1,108,019 | 8/1914 | Strickler . | |
|---|---|---|---|
| 2,234,406 | 3/1941 | Hatfield et al. | 119/61 |
| 3,485,215 | 12/1969 | Scott et al. | 119/57.4 |
| 3,502,053 | 3/1970 | Geerlings | 119/57.4 X |
| 3,717,126 | 2/1973 | Falcone et al. . | |
| 3,738,324 | 6/1973 | Keen et al. | 119/61 X |
| 3,738,329 | 6/1973 | Schweitzer | 119/63 |
| 4,995,343 | 2/1991 | Cole et al. | 119/53 |
| 5,007,380 | 4/1991 | Badia et al. | 119/53 |
| 5,092,274 | 3/1992 | Cole et al. | 119/57.4 |
| 5,097,797 | 3/1992 | Van Zee et al. | 119/57.4 |
| 5,101,765 | 4/1992 | Manfrin | 119/53 |
| 5,113,797 | 5/1992 | van Daele | 119/53 |
| 5,275,131 | 1/1994 | Brake et al. | 119/63 |
| 5,311,839 | 5/1994 | Pollock et al. | 119/53 |
| 5,406,907 | 4/1995 | Hart | 119/53 |
| 5,462,017 | 10/1995 | Pollock et al. | 119/57.4 |

*Primary Examiner*—Robert P. Swiatek
*Attorney, Agent, or Firm*—Price, Heneveld, Cooper, DeWitt & Litton

[57] ABSTRACT

A poultry breeder pan feeder system and method in which a feeder pan assembly having a grille with ribs defining openings for feeding pullets and the like is converted into a female breeder pan assembly by providing such pan assembly for feeding male poultry pullets and the like and inserting an outer grille over the inner grille. The outer grille has ribs that overlap the ribs of the inner grille and cover portions of the feeder openings of the inner grille. The outer grille is adjustable on the inner grille to adjust the size of the openings through which the birds feed. A linear slide valve is provided to adjust the amount of feed dropping into the pan of the feeder so that the feed dropped into the pans can be a preselected amount, can flood the pan, or can be entirely shut off.

20 Claims, 8 Drawing Sheets

POULTRY BREEDER PAN FEEDING SYSTEM AND PAN FEEDER ASSEMBLY THEREFOR

This invention relates to a poultry breeder pan feeding system and method and particularly to a pan feeder assembly for discouraging male poultry breeders from feeding from such assemblies leaving such pan assemblies for the female breeders to eat therefrom and encouraging the male breeders to eat in other pans provided in the system. This invention also relates to the conversion of a pullet feeder to a female breeder feeder.

BACKGROUND OF THE INVENTION

Automated feeding systems for feeding male and female breeders within the same area so that ultimately the breeders can produce fertile eggs for hatching have been in use for a long time. However, to my knowledge, no system has been devised that is entirely satisfactory because the male breeders are very aggressive and monopolize the feeders leaving the timid female breeders with very little chance to feed due to restricted amounts of feed each feeding time. Consequently, body weight that provides optimum egg production, fertility, and hatchability cannot be ensured unless male and female breeders are allowed access to feed simultaneously.

Different means have been employed to accomplish what is generally referred to as sex-separate feeding in male/female breeder flocks. One such method is to provide female only grilles by providing openings in feeder pans which are slightly narrower than the pans for the males. The males are irritated when they insert their heads through the narrower openings. Such solution has not been particularly satisfactory because to date, both of the designs of the male and female breeder pan assemblies have been substantially different than the pan assemblies for pullets, which are young potential breeders, resulting in more cost. Further, the female breeder pan assemblies have had very little flexibility in selection of grille adjustments.

Another attempt to accomplish sex-separate feeding in pullet/breeder flocks is to design a pan which will exclude females from the male feeders as disclosed in U.S. Pat. No. 5,275,131.

In view of the foregoing, which is costly, an object of the present invention is to provide a pan feeder assembly that can be easily converted from a relatively open pullet pan assembly to a female breeder pan assembly with very little additional cost. The pan feeder assembly allows for flexibility in breeder pan feeding systems and methods.

SUMMARY OF THE INVENTION

In accordance with my invention, I provide a construction of a poultry pan feeder assembly that can be utilized as a pullet pan assembly and can be easily converted to a restricted female pan assembly. This is accomplished by providing a pan above which is located an inner grille which has a plurality of spaced first openings located around its periphery permitting poultry to insert portions of their heads therethrough for eating the feed from the pan. An outer grille is fitted over the inner grille and also includes spaced openings around its periphery, the openings being separated by ribs permitting poultry to insert portions of their heads therethrough for eating feed from the pan. The ribs have portions thereof extending into the openings of the inner grille to restrict the size of the openings in the inner grille whereby male breeders in attempting to eat out of the pans scrape portions of their heads on the edges of the ribs and therefore are discouraged from eating feed out of the pan.

With this combination of the female pan feeder assemblies and the male breeder pan assemblies, the males become sufficiently smart to feed only out of pans having unrestricted openings, leaving the females to eat out of the pan assembly having both the inner and outer grille. Males and females need different amounts of feed each feeding as they mature due to their difference in size and metabolic needs.

In accordance with my invention, the resulting opening in the poultry pan feeder can be adjusted in width and depth since some breeder lines have narrower heads. I provide for example, seven restrictive widths for the resultive opening in the pan feeder varying from 41 mm to 50 mm and three heights.

In this system I also provide a pullet feeder pan assembly which is identical to the female breeder pan feeder assembly except that the outer grille is removed whereby the openings in the inner grille, which is the only grille remaining, does not irritate the heads of the pullets or other poultry feeding therefrom.

This invention also provides a pan feeder assembly structure by which the pan can be flooded with feed, the feed in the pan can be regulated to a predetermined level or completely prohibited from falling into the pan from the conveyor. This is accomplished by an elongated slide valve which in the preferred embodiment includes flanges extending around the sides of the trough or tube for selecting one of the above modes of feed flow into the pan.

Another aspect of this invention is the method of converting a feed pan assembly particularly suitable for feeding pullets into a pan assembly which is constructed to discourage males from feeding out of the converted poultry feeder assembly with the female breeders.

The above and other features, advantages, and objects of the present invention will be further understood and appreciated by those skilled in the art by reference to the following specification, claims, and appended drawings.

DETAILED DESCRIPTION OF THE PREFERRED EMBODIMENT

Figure 1:
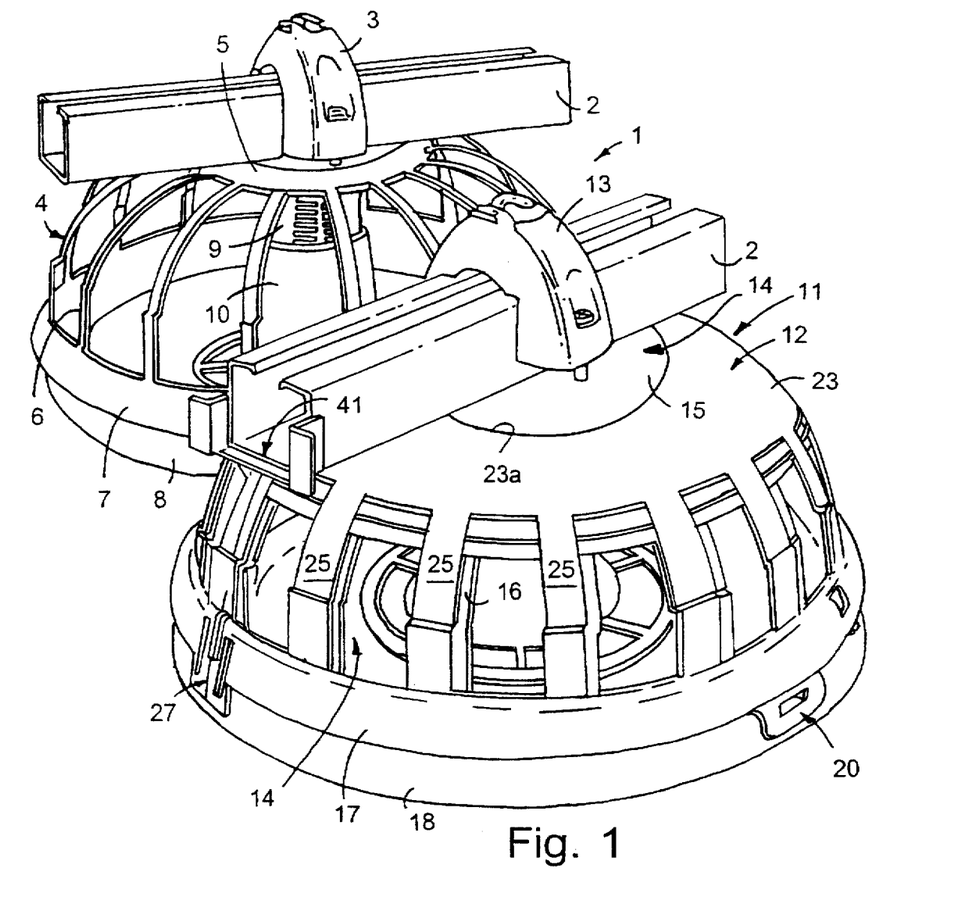
FIG. 1 is a perspective side elevational view of the two pans utilized in the pullet/breeder feeding system and method of this invention.

Referring to the drawings, FIG. 1 discloses two feeder pan assemblies 1 and 11 utilized in the poultry pan system of this invention. Pan assembly 1 shall herein be referred to as the pullet pan assembly whereas pan assembly 11 shall be herein referred to as the female breeder pan assembly. Male breeders are very aggressive and tend to monopolize the feeders as discussed above. Therefore, pan 1 provides wide openings through which the pullets which are young, potential breeders can feed from the pan whereas the female breeder pan assembly 11 includes restricted openings of a size which the heads of the male breeders will rub against. Male breeders detest such rubbing, particularly against the eye areas, and therefore are discouraged from eating out of the female breeder pan assembly 11.

Pan assembly 1 includes a cap 3 which supports the grille 4 on the trough 2. Grille 4 includes a top support member 5 having ribs 6 extending downwardly therefrom and terminating at the ring 7 which supports the pan 8. A drop tube 9 extends downwardly from the top support member 5 and is adapted to adjustable support the regulating skirt 10. This drop tube and regulating skirt combination can take many forms, such as that disclosed in my U.S. Pat. No. 5,406,907. Therefore, it is not considered necessary to describe the entire details of the drop tube and regulator skirt other than what is disclosed in the drawings.

The female breeder pan assembly 11 includes all of the elements of the pullet pan assembly 1 and in addition includes an outer grille 12 of substantially the same overall shape and size to fit over the inner grille which is identified by reference numeral 14. Thus, pan assembly 11 is supported on trough 2 by the cap 13 which is secured to the top 15 of inner grille 14, it being understood that inner grille 14 is preferably identical to grille 4 of the breeder pan assembly 1.

Figure 6:
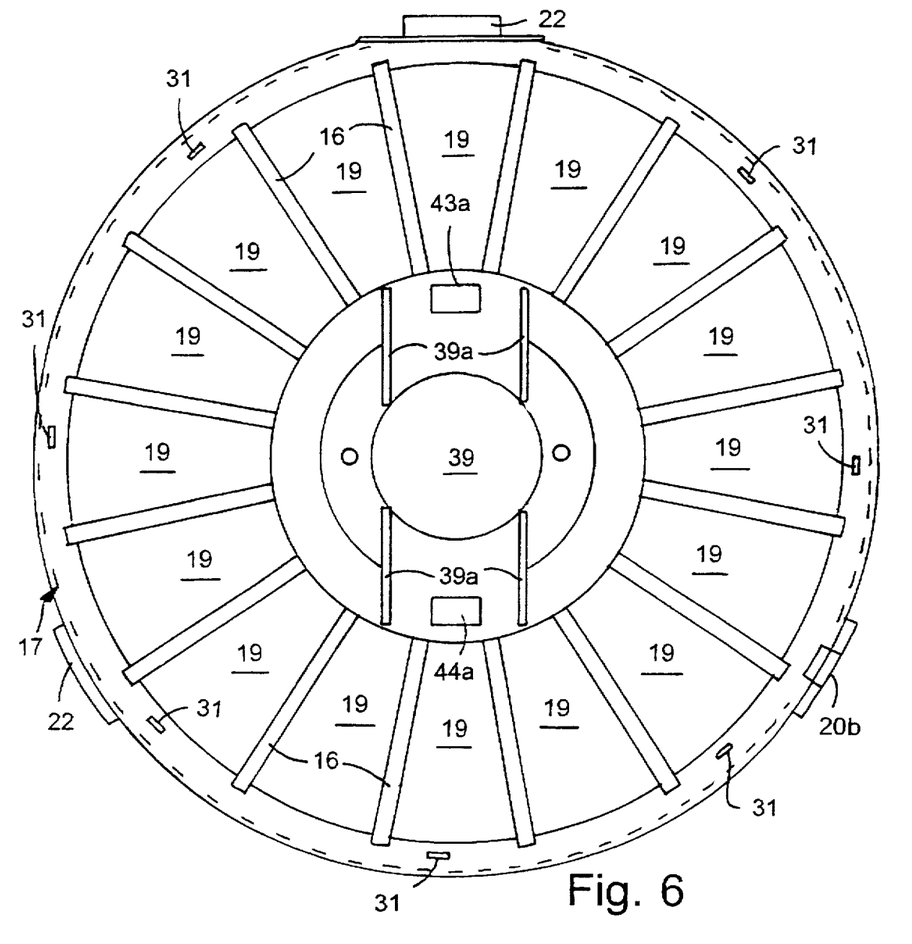
FIG. 6 is a plan view of the inner grille of FIG. 5.

Referring to FIGS. 3, 4, 7, and 8, outer grille 12 is of substantially the same size as the inner grille 14. It includes a dome 23 in which an opening 23a is provided so as to expose the top 15 of the inner grille 14. This permits the inner grille 14 and the outer grille 12 to be hung on a trough by means of the cap 13 which includes the openings 13a through which the bolts 15b extend and are secured by nuts 15c extending through the capped openings 15a of the top 15. It will be noted that the inner grille 14 includes the ribs 16 and the ring 17 like the ribs 6 and ring 7 of the pullet pan assembly 1. The ring 17 supports the pan 18 by means of a hinge 20 formed by the pintel 20a and the hinge element 20b at one side of the pan and inner grille and the catch 21 fitting into the latch 22. Two such latch arrangements are provided as disclosed in FIG. 6. The latch and catch arrangement provides for a quick release and the hinge 20 allows the pan 18 to swing down for cleaning.

Figure 9:
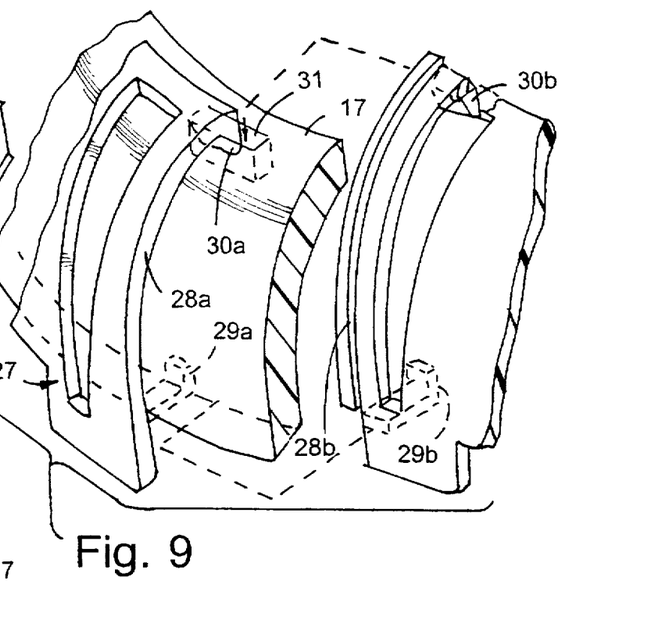
FIG. 9 is a fragmentary view of the structure for connecting the restrictive grille of FIG. 6 to the inner grille of FIG. 4.

Having described the structure of the inner grille 14 and its support of the feed pan 18, it should be understood that the structure of the inner grille is substantially identical to that of the pullet pan assembly 1. The difference in the female breeder pan assembly, as referred to above, is the provision for an outer grille 12 which fits over the inner grille 14. Outer grille 12 includes a dome portion 23 connected to a lower rim portion 24 by the ribs 25. Dome 23 is separated at the seam 23b and circular rim 24 is separated at 27 (FIGS. 3 and 9) wherein the end edges 28a and 28b abut each other when the outer grille is mounted on the inner grille. Such mounting is accomplished by providing the hooks 29a and 29b that hook under the ring 17 and the tabs 30a and 30b that are inserted side-by-side into one of the seven openings or grooves 31 located along the periphery of the upper surface of the ring 31 of the inner grille 14. This structure at 27 permits the entire outer grille to be adjusted circumferentially of the inner grille. There are seven such adjustments wherein the restrictive widths of the opening to the pan can be varied from 1.614 inches (41 mm) to a maximum of 1.97 inches (50 mm). The specific widths which I have provided are as follows:

Min.—1.614" (41 mm)
1.693" (43 mm)
1.732" (44 mm)
1.811" (46 mm)
1.850" (47 mm)
1.900" (48 mm)
Max.—1.970" (50 mm)

Figure 10A:
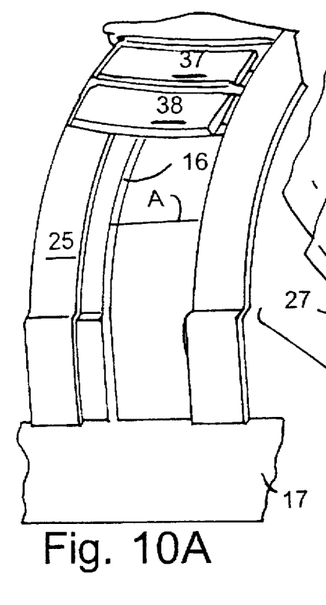
FIGS. 10a, 10b, and 10c are fragmentary views of three different positions of the outer restrictive grille on the inner grille and demonstrating three different restrictive openings for the poultry to feed from the feeder pan.
Figure 10B:
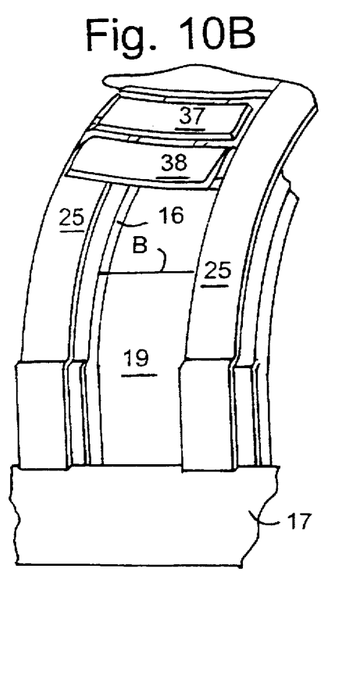
Figure 10C:
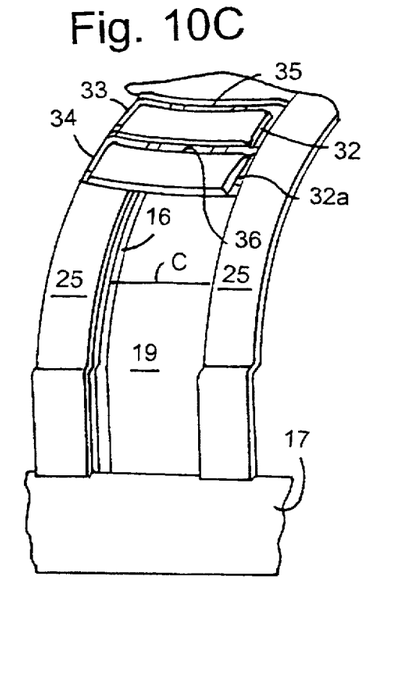

These restrictive widths are accomplished by ribs 25 of the outer grille being located at different positions relative to the ribs 16 of the inner grille 14, that is, ribs 25 extend over at least portions of the ribs 16 and into the openings 19 between ribs 16. FIGS. 10a, 10b, and 10c, demonstrate this phenomenon wherein arrows A in FIG. 10a, B in FIG. 10b, and C in FIG. 10c, disclose the various widths of the openings for three different circumferential positions of the outer grille 12 on the inner grille 14.

Figure 3:
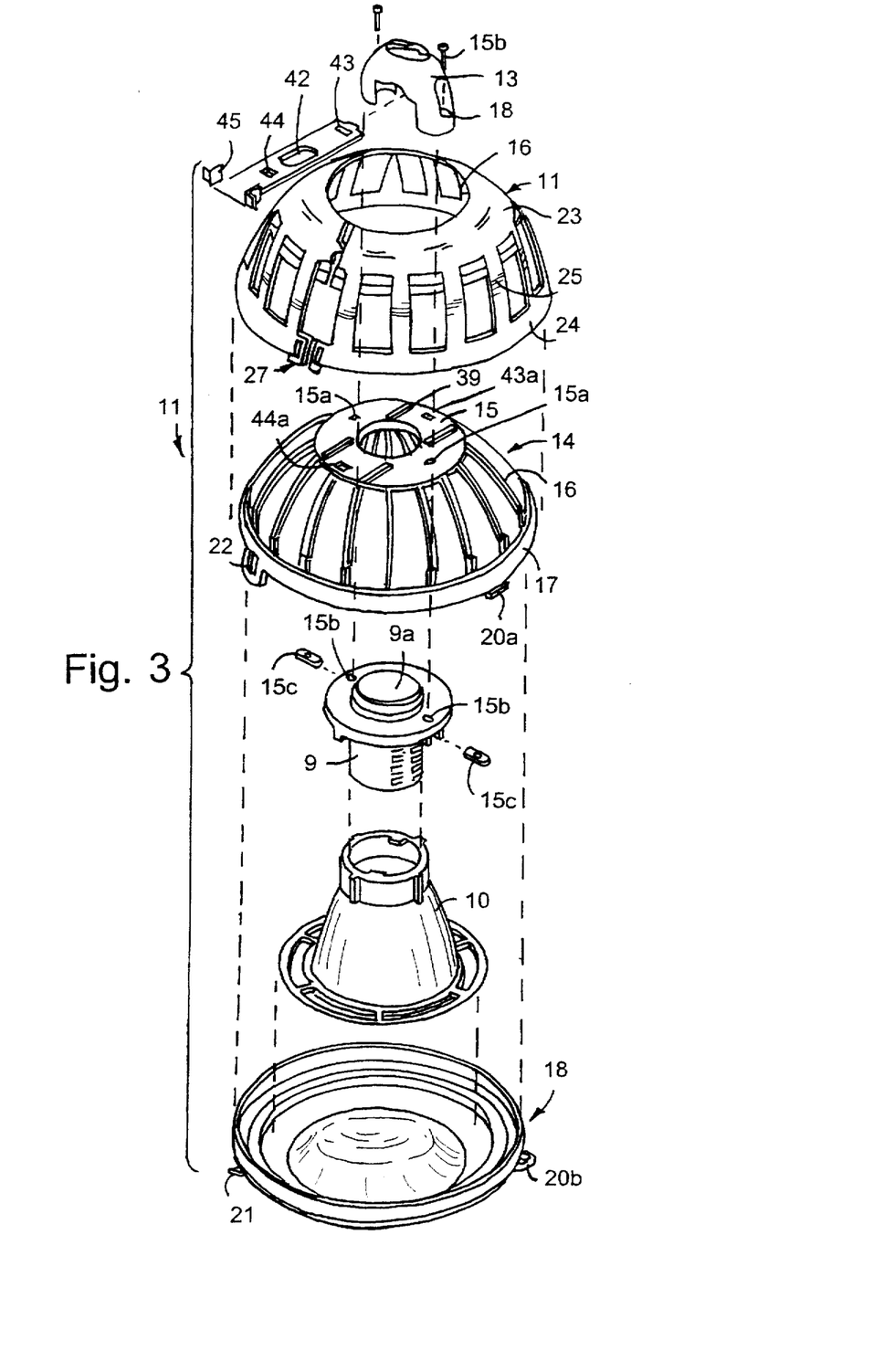
FIG. 3 is an exploded perspective view of the components forming the female breeder pan feeder assembly of this invention.
Figure 4:
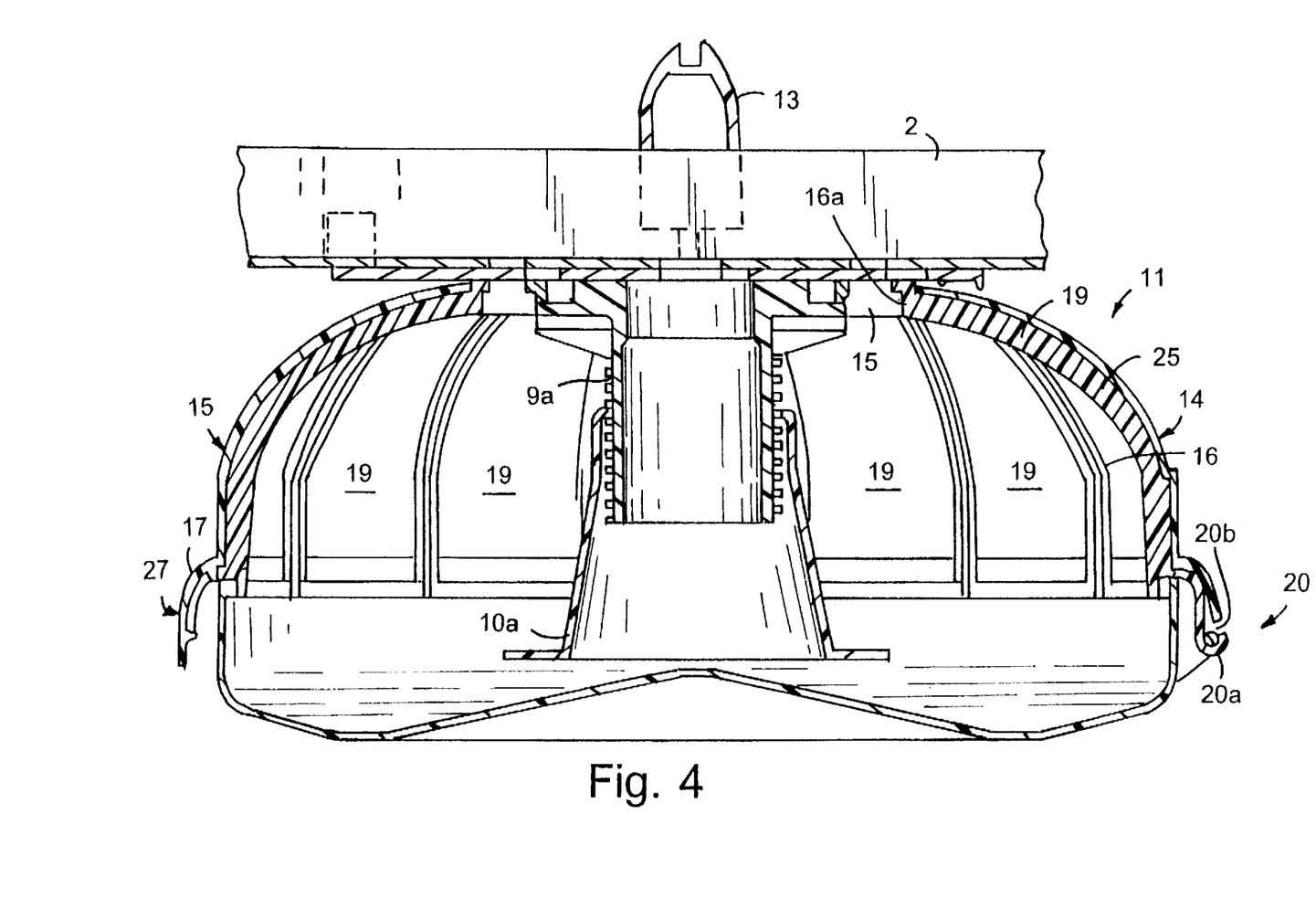
FIG. 4 is a cross section of the feeder pan assembly of FIGS. 1 and 3.
Figure 5:
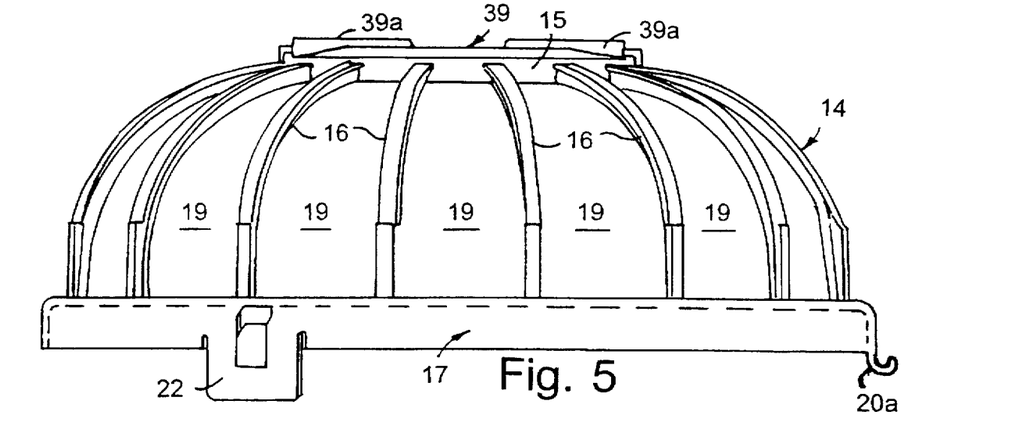
FIG. 5 is a side elevational view of the inner grille forming a component of the pan feeder assembly of this invention.
Figure 7:
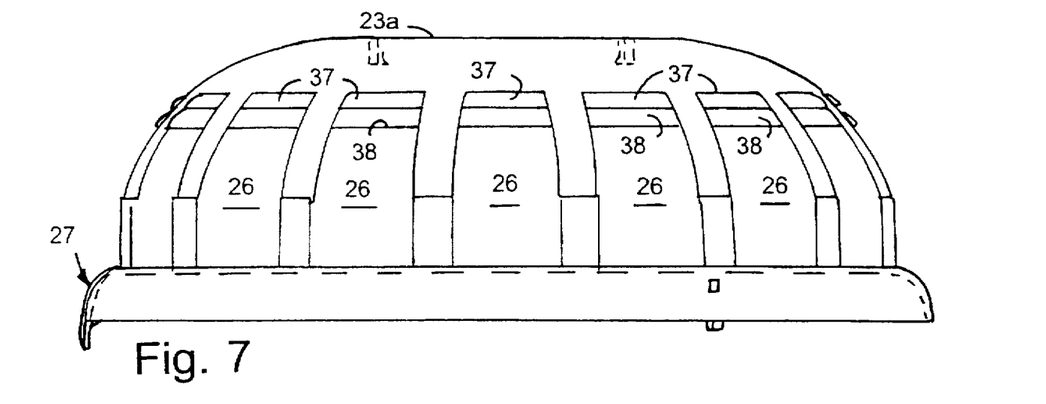
FIG. 7 is a side elevational view of the outer restrictive grille forming a part of the female breeder pan feeder assembly of this invention.
Figure 8:
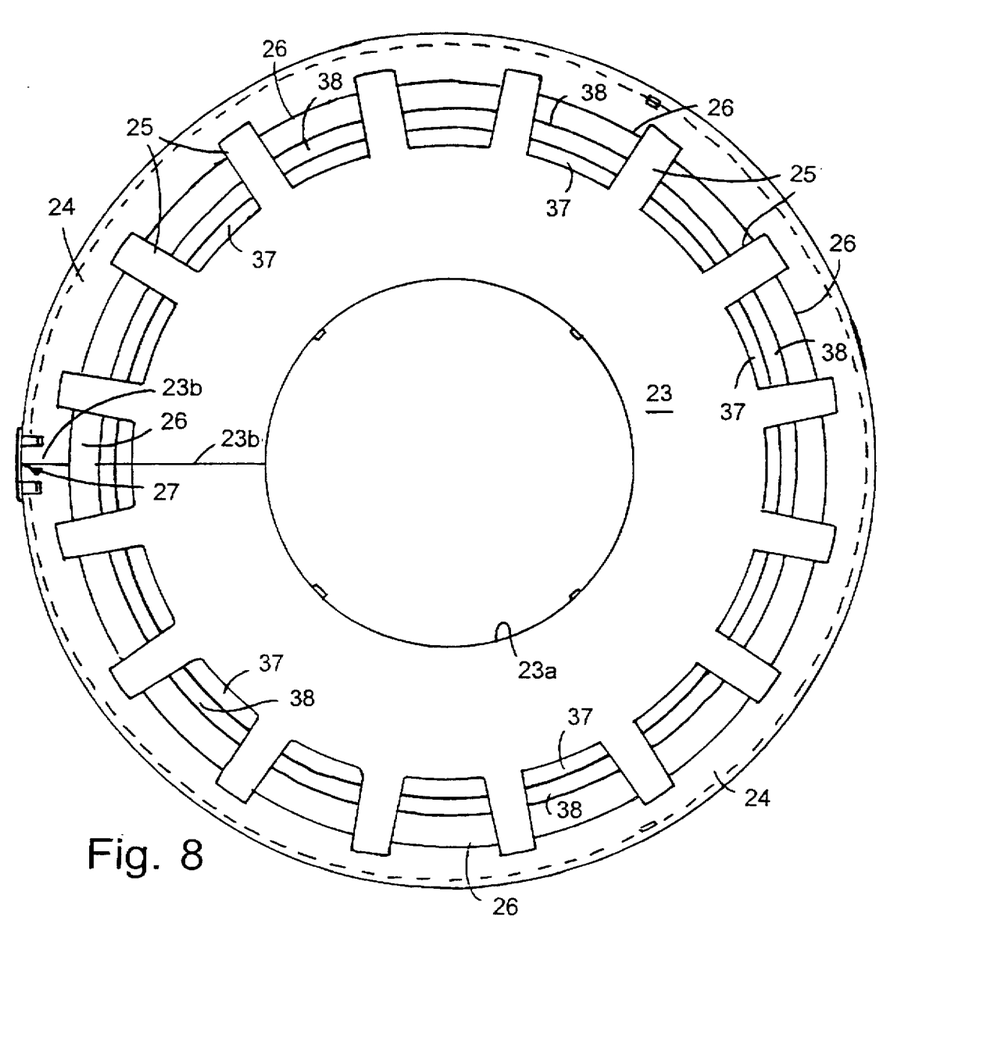
FIG. 8 is a plan view of the grille of FIG. 7.

FIGS. 10a, 10b, and 10c along with FIGS. 3, 7, and 8 disclose another narrower aspect of this invention wherein the openings in the outer grille can be increased in height by removing certain portions of the dome 23. As best disclosed in FIGS. 10a, 10b, and 10c, cutout portions 32, 33, 34, 35, and 36 are cutout from the dome 23 permitting sections 37 and 38 to be easily removed so as to provide three restrictive heights. Although various heights can be selected, I have provided a low height of 2.58 inches (65 mm) (FIG. 10a), a medium height of 2.95 inches (75 mm) (FIG. 10b), and the maximum height of 3.31 inches (84 mm) (FIG. 10c).

Figure 2:
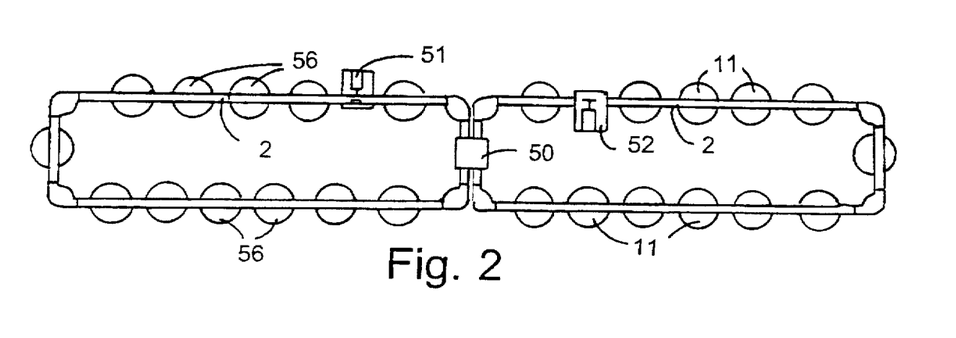
FIG. 2 is a sketch of a two loop poultry feeding system which can be utilized in the breeder pan system of my invention, although other numerous arrangements are possible.

FIG. 2 discloses a schematic of a system utilizing the male breeder pan assemblies 56 which can be of many different designs and female breeder pan assemblies in one area, the pans being separated so that the male breeders gather around the breeder pans 56 and the female breeders gather around the female pan assemblies 11. FIG. 2 discloses the single hopper 50 to which the troughs 2 are conventionally operatively attached and the drive mechanisms 51 and 52 which drive the chains (not shown) that slide in the trough and convey the feed over the pan assemblies. This system of FIG. 2 is only one of many different types of arrangements that could be made for using the male breeder pan assemblies 56 and the female breeder pan assemblies 11 within the same area wherein male and female breeders are kept for breeding purposes to produce fertile eggs for hatching.

In feeding poultry, it is frequently desirable to control the amount of feed dropped into the pan. Occasionally, it is desired to flood the pan with feed. Other times it is desirable to regulate the amount of feed in the pan, and at other times it is desirable to entirely shut off the flow of the feed into the pan. FIGS. 3 and 11–18 disclose structure for accomplishing this regulation of feed into the pan from the conveyor. I accomplish this by providing a linearly adjustable slide valve 41 (FIGS. 14 and 15), which as disclosed in FIGS. 3, 11, 12, and 13 are mounted to slide over openings provided in the trough 2. Slide valve 41 includes a flat rigid sheet of material having a central opening 42 and two openings 43 and 44 located on each side thereto. At one end a flange 45 extends upwardly and includes a tab 46 extending laterally. Slide valve 41 is mounted under the trough 2 (FIGS. 3, 11, 12, and 13) and between flanges 39a of the inner grille 14 with the flanges 45 extending upwardly along each side of the trough 2. The tabs 46 extend outwardly from the trough to provide a finger which the operator can grasp and actuate the slide valve to one of three positions as disclosed in FIGS. 11, 12, and 13.

Figure 11:
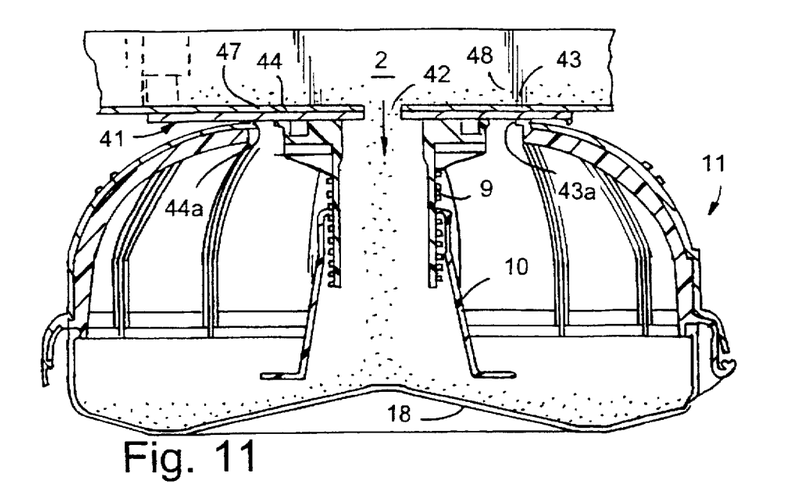
FIGS. 11, 12, and 13 are side elevational sketches demonstrating the control of the dropping of the feed into the feed pan.

In the first position of FIG. 11, opening 42 is located directly over the opening 39 of the inner grille 14 which leads to the opening 9a of the drop tube 9. In this position the openings 43 and 44 are misaligned with openings 48, 43a, 47, and 44a, respectively, so that the feed only drops through the drop tube 9. The regulating skirt 10 is adjusted on drop tube 9 to regulate the level of the feed in the pan as disclosed in FIG. 4.

Figure 12:
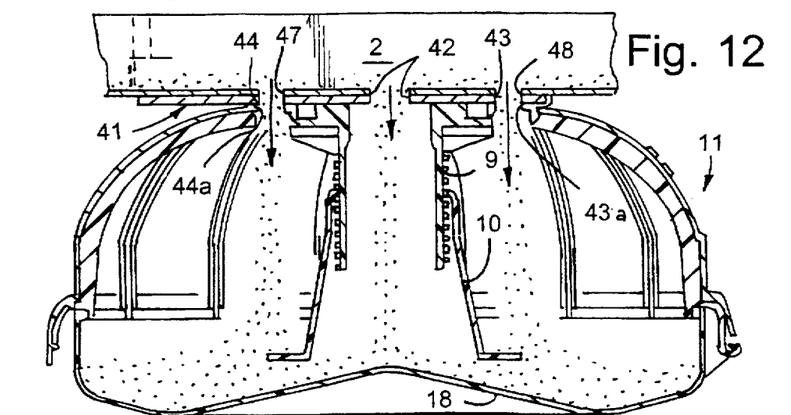
Figure 13:
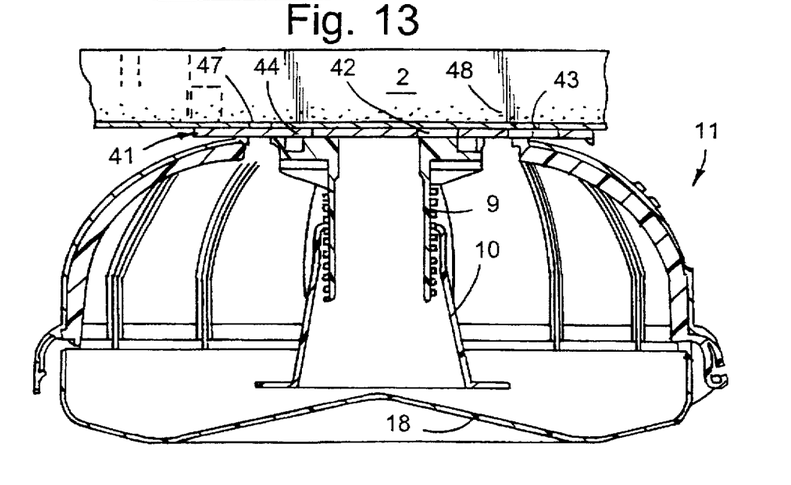
Figure 14:
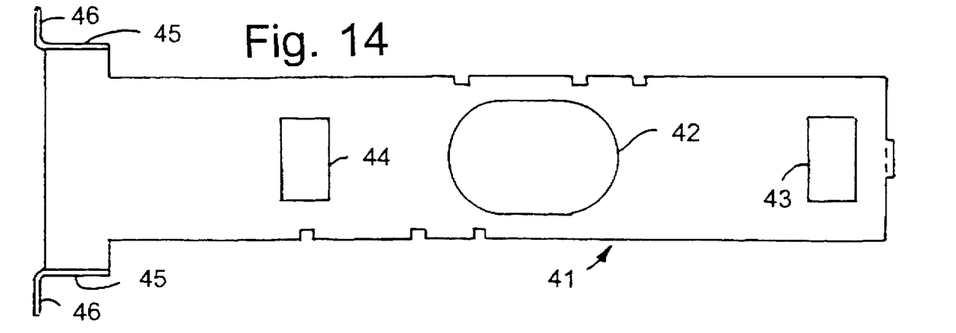
FIG. 14 is a plan view of the slide valve utilized in controlling the dropping of the feed into the pan as demonstrated by FIGS. 11, 12, and 13.
Figure 15:
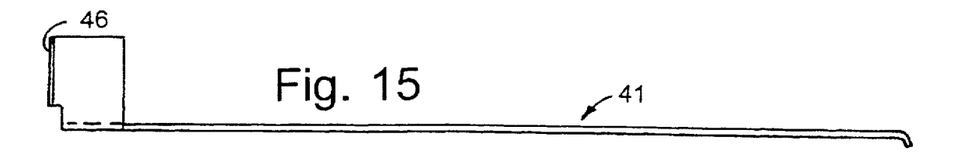
FIG. 15 is a side elevational view of the slide valve of FIG. 14.
Figure 16:
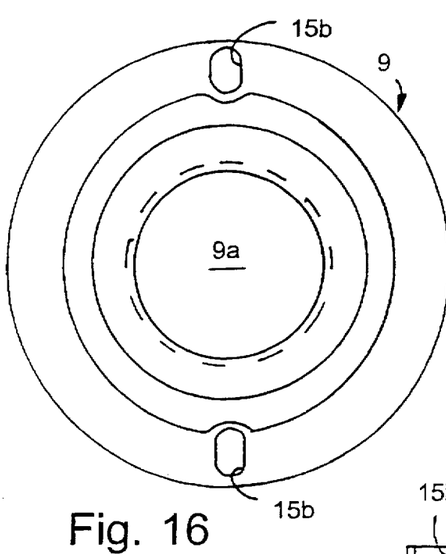
FIG. 16 is a plan view of the drop tube which is a component of my pan assembly.

In another position of FIG. 12, slide valve 41 is located in a position wherein openings 43 and 44 are aligned with openings 47 and 48 of tube 2 and openings 43a and 44a, respectively. Also, opening 42 is located over the openings 39 and 9a to the drop tube 9. As disclosed in FIG. 12, the feed drops through all of the openings 47, 44, 44a, 48, 43, and 43a and through the drop tube 9 so as to flood pan 18.

In another position, the slide valve 41 completely closes off all the openings to the drop tube 9 thus completely stopping the flow of any feed into the pan 18. This is demonstrated in FIG. 13.

Figure 17:
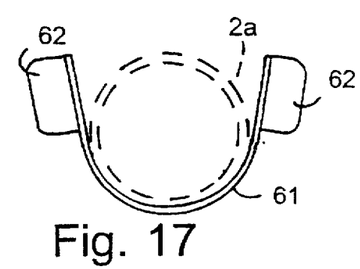
FIG. 17 is a cross section of a modified slide valve for use in a (shown in phantom) tube forming a part of the conveyor as opposed to a trough as disclosed in FIG. 1.
Figure 18:
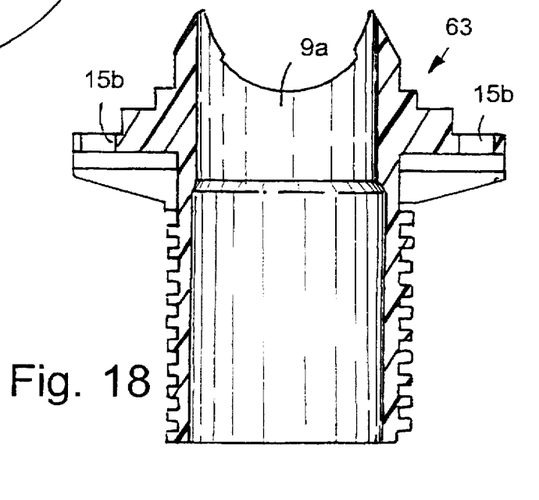
FIG. 18 is a side elevational view of a drop tube utilized with a tube conveyor and the slide valve of FIG. 17.

Although previously, I have disclosed a sliding valve for use in a trough, the same concept can be utilized in conjunction where the conveyor is a tube. FIG. 17 shows a cross section of such a slide valve 61 which fits under the tube 2a (disclosed in phantom) and includes the tabs 62. In such event, the drop tube 63 like that of drop tube 9 is shaped as disclosed in FIG. 18.

Having described my invention, it should become evident that I have solved, or at least minimized many of the problems of pullet/breeder feeding. While I have described particular embodiments of the invention in detail, it should be obvious to those skilled in the art that changes and modifications in various aspects thereof may be made without departing from the spirit of this invention.

The embodiments of the invention in which an exclusive property or privilege is claimed are defined as follows:

1. A poultry pan feeder assembly comprising:
   a pan for containing feed;
   an inner grille mounted above said pan and having a plurality of first spaced ribs supporting said pan and providing spaced first openings therebetween located around its periphery permitting poultry to insert portions of their heads therethrough for eating said feed from said pan;
   an outer grille fitted over said inner grille, said outer grille including spaced second openings around its periphery, said openings being separated by second ribs, said openings permitting poultry to insert portions of their heads therethrough for eating feed from said pan;
   said second ribs each having a greater width than thickness and located closely adjacent to said first ribs; and
   said second ribs having portions of said widths thereof overlapping said first ribs and extending into said first openings to restrict the size of said first openings through which poultry can insert their heads whereby male poultry breeders in attempting to eat out of said pans scrape portions of their heads on the edges of said second ribs and therefore are discouraged from eating feed out of said pans.

2. The poultry pan feeder assembly of claim 1 in which said inner and outer grilles having support tops with openings for receiving feed; an elongated feed conveyor having feed openings; and said tops being mounted on said elongated feed conveyors below said feed openings for receiving feed through said openings into said pan.

3. The poultry pan feeder assembly of claim 2 in which said inner and outer grilles each include top members and lower members between which said first and second ribs extend; a drop tube extending downwardly from the tops of said inner and outer grille and said top openings are located to permit feed to selectively drop inside or outside of said drop tube; said feed conveyor having an elongated slide valve slidable linearly along said feed conveyor for selectively controlling the dropping of feed into said pan either inside and outside said drop tube, or only inside said drop tube, or for shutting off the dropping of said feed into said pan.

4. The poultry pan feeder assembly of claim 3 in which said conveyor includes an elongated chamber member in which feed is conveyed; selectively controlling the dropping of feed into said pan either inside and outside said drop tube, or only inside said drop tube, or for shutting off the dropping of said feed into said pan.

5. The poultry pan feeder assembly of claim 1 in which an adjustment mechanism is provided whereby said outer grille is adjustable on said inner grille to adjust the amount of said ribs which extend into said first openings.

6. The poultry pan feeder assembly of claim 5 in which said adjustment mechanism includes said inner grille having a substantially horizontal surface with peripherally spaced openings and said outer grille includes at least one vertically extending tab; said tab being selectively located in one of said openings.

7. The poultry pan feeder assembly of claim 1 in which said first openings are taller than the second openings; said outer grille including a dome above said second openings; said dome having portions cutout of the dome above said second openings whereby the size of said second openings can be made taller by clipping out areas of said dome between said portions.

8. The poultry pan feeder assembly of claim 1 in which said outer grille includes a dome above said openings; said first openings of said inner grille being formed by open spaces between an upper support, a lower ring and said second ribs extending between said upper support and lower ring, said dome covering the upper portions of said open spaces.

9. The poultry pan feeder assembly of claim 1 in which said first openings are taller than the second openings; said outer grille includes a dome above said openings; said first openings of said inner grille being formed by open spaces between an upper support, a lower ring and said second ribs extending between said upper support and lower ring, said dome covering the upper portions of said open spaces, said dome having portions cutout of the dome above said second openings whereby the size of said second openings can lbe made taller by clipping out the areas of said dome between said portions.

10. A poultry pan feeder assembly comprising:

a pan for containing feed;

an inner grille mounted above said pan and having a plurality of first spaced ribs supporting said pan and providing spaced first openings therebetween located around its periphery permitting poultry to insert portions of their heads therethrough for eating said feed from said pan;

an outer grille fitted over said inner grille, said outer grille including spaced second openings around its periphery said openings being separated by second ribs, said openings permitting poultry to insert portions of their heads therethrough for eating feed from said pan;

said second ribs having portions thereof overlapping said first ribs and extending into said first openings to restrict the size of said first openings through which poultry can insert their heads whereby male poultry breeders in attempting to eat out of said pans scrape portions of their heads on the edges of said second ribs and therefore are discouraged from eating feed out of said pans; and an adjustment mechanism being provided whereby said outer grille is adjustable on said inner grille to adjust the amount of said ribs which extend into said first openings.

11. The poultry pan feeder assembly of claim 10 in which said adjustment mechanism includes said inner grille having a substantially horizontal surface with peripherally spaced openings and said outer grille includes at least one vertically extending tab; said tab being selectively located in one of said openings.

12. A poultry pan feeder assembly comprising:

a pan for containing feed;

an inner grille mounted above said van and having a plurality of first spaced ribs supporting said pan and providing spaced first openings therebetween located around its periphery permitting poultry to insert portions of their heads therethrough for eating said feed from said pan;

an outer grille fitted over said inner grille, said outer grille including spaced second openings around its periphery, said openings being separated by second ribs, said openings permitting poultry to insert portions of their heads therethrough for eating feed from said pan;

said second ribs having portions thereof overlapping said first ribs and extending into said first openings to restrict the size of said first openings through which poultry can insert their heads whereby male poultry breeders in attempting to eat out of said pans scrape portions of their heads on the edges of said second ribs and therefore are discouraged from eating feed out of said pans; and said first openings being taller than the second openings; said outer grille including a dome above said second openings; said dome having portions cutout of the dome above said second openings whereby the size of said second openings can be made taller by clipping out areas of said dome between said portions.

13. A poultry pan feeder assembly comprising:

a pan for containing feed;

an inner grille mounted above said pan and having a plurality of first spaced ribs supporting said pan and providing spaced first openings therebetween located around its periphery permitting poultry to insert portions of their heads therethrough for eating said feed from said pan;

an outer grille fitted over said inner grille said outer grille including spaced second openings around its periphery said openings being separated by second ribs said openings permitting poultry to insert portions of their heads therethrough for eating feed from said pan;

said second ribs having portions thereof overlapping said first ribs and extending into said first openings to restrict the size of said first openings through which poultry can insert their heads whereby male poultry breeders in attempting to eat out of said pans scrape portions of their heads on the edges of said second ribs and therefore are discouraged from eating feed out of said pans; and said outer grille including a dome above said openings; said first openings of said inner grille being formed by open spaces between an upper support, a lower ring and said second ribs extending between said upper support and lower ring, said dome covering the upper portions of said open spaces.

14. A poultry pan feeder assembly comprising:

a pan for containing feed;

an inner grille mounted above said pan and having a plurality of first spaced ribs supporting said pan and providing spaced first openings therebetween located around its periphery permitting poultry to insert portions of their heads therethrough for eating said feed from said pan;

an outer grille fitted over said inner grille, said outer grille including spaced second openings around its periphery, said openings being separated by second ribs, said openings permitting poultry to insert portions of their heads therethrough for eating feed from said pan;

said second ribs having portions thereof overlapping said first ribs and extending into said first openings to restrict the size of said first openings through which poultry can insert their heads whereby male poultry breeders in attempting to eat out of said pans scrape portions of their heads on the edges of said second ribs and therefore are discouraged from eating feed out of said pans; and said first openings being taller than the second openings; said outer grille includes a dome above said openings; said first openings of said inner grille being formed by open spaces between an upper support, a lower ring and said second ribs extending between said upper support and lower ring, said dome covering the upper portions of said open spaces, said dome having portions cutout of the dome above said second openings whereby the size of said second openings can be made taller by clipping out the areas of said dome between said portions.

15. A poultry pan feeder assembly comprising:

a pan for containing feed;

an inner grille mounted above said pan and having a plurality of first spaced ribs supporting said pan and providing spaced first openings therebetween located around its periphery permitting poultry to insert portions of their heads therethrough for eating said feed from said pan;

an outer grille fitted over said inner grille, said outer grille including spaced second openings around its periphery, said openings being separated by second ribs, said openings permitting poultry to insert portions of their heads therethrough for eating feed from said pan;

said second ribs having portions thereof overlapping said first ribs and extending into said first openings to restrict the size of said first openings through which poultry can insert their heads whereby male poultry breeders in attempting to eat out of said pans scrape portions of their heads on the edges of said second ribs and therefore are discouraged from eating feed out of said pans;

said inner and outer grilles having support tops with openings for receiving feed; an elongated feed conveyor having feed openings; and said tops being mounted on said elongated feed conveyors below said feed openings for receiving feed through said openings into said pan; and said inner and outer grilles each includes top members and lower members between which said first and second ribs extend; a drop tube extending downwardly from the tops of said inner and outer grille and said top openings are located to permit feed to selectively drop inside or outside of said drop tube; said feed conveyor having an elongated slide valve slidable linearly along said feed conveyor for selectively controlling the dropping of feed into said pan either inside and outside said drop tube, or only inside said drop tube, or for shutting off the dropping of said feed into said pan.

16. The poultry pan feeder assembly of claim 15 in which said conveyor includes an elongated chamber member in which feed is conveyed; selectively controlling the dropping of feed into said pan either inside and outside said drop tube, or only inside said drop tube, or for shutting off the dropping of said feed into said pan.

17. A poultry feeder pan assembly comprising:

a pan for containing feed;

a grille having a top member and downwardly extending ribs supporting said pan at their lower ends;

an elongated feed conveyor having feed openings;

said top member including structure for mounting said pan assembly on said an elongated feed conveyor below said feed openings;

a drop tube extending downwardly from said top member; and said top member having openings located to permit feed to selectively drop inside or outside of said drop tube; said feed conveyor having a slide valve slidable linearly along said feed conveyor for selectively controlling the dropping of feed into said pan either inside and outside said drop tube, or only inside said drop tube, or for shutting off the dropping of said feed into said pan.

18. The poultry feeder pan assembly of claim 17 in which said conveyor includes an elongated member in which feed is conveyed; said slide valve having a portion thereof substantially the same width as said member and located under said member, said slide valve including at least one flange extending therefrom upwardly along one side of said member whereby said slide valve can be slidably adjusted longitudinally of said member selectively controlling the dropping of feed into said pan either inside and outside said drop tube, or only inside said drop tube, or for shutting off the dropping of said feed into said pan.

19. A method of converting a poultry pan feeder assembly to a female breeder poultry feeder assembly said poultry pan feeder assembly comprising a pan and a first grille mounted above said pan by ribs extending therebetween providing first openings through which poultry are permitted to feed; the steps of:

providing a second grille of a shape and size to snugly fit over said first grille, said second grille having second ribs extending downwardly toward said pan, said second ribs having edges; and arranging said second ribs over said first edges in a position wherein said edges extend into said first openings to restrict the size thereof to discourage male poultry breeders from eating out of said pan.

20. The method of claim 19 in which the second grille is adjustable to adjust the extended position of said edges into said first openings as required by the size of the male poultry breeder heads of the breeder flock which is being discouraged from eating out of said pan.

* * * * *